Aug. 8, 1933. J. K. HEYMAN ET AL Re. 18,914

MAN'S UNDERWEAR

Original Filed July 11, 1931 2 Sheets-Sheet 1

Inventors:
Joseph K. Heyman
Alfred F. Wenzel
By Williams, Bradbury, McCaleb & Hinkle
Attys.

MAN'S UNDERWEAR

Original Filed July 11, 1931 2 Sheets-Sheet 2

Inventors:
Joseph K. Heyman
Alfred F. Wenzel
By Williams, Bradbury, McCaleb & Hinkle.
Attys.

Reissued Aug. 8, 1933

Re. 18,914

UNITED STATES PATENT OFFICE 18,914

MAN'S UNDERWEAR

Joseph K. Heyman, Chicago, Ill., and Alfred F. Wenzel, Michigan City, Ind., assignors to Reliance Manufacturing Company, Chicago, Ill., a Corporation of Illinois Original No. 1,845,749, dated February 16, 1932, Serial No. 550,056, July 11, 1931. Application for reissue December 30, 1932. Serial No. 649,540

3 Claims. (Cl. 2—224)

Our invention relates to men's underwear, and more particularly to the type of man's athletic underwear generally designated as shorts or track pants.

Our invention is concerned with an improved construction of continuous facing for the fly opening whereby the garment is better adapted to withstand certain classes of strains which we have found to be the most frequent cause of athletic shorts tearing at the crotch of the fly opening.

We have found, contrary to general belief, that strains which result in tearing at the crotch of the fly opening are not parallel with the facing and therefore cannot be successfully borne by a mere continuous facing. Nor does the tearing strain in question come from such an extreme movement by the wearer as exemplified by kicking a football, for that produces merely a strain across the crotch of the garment as a whole,—not the crotch of the fly opening. We have found that the tearing strain upon the crotch of the fly opening comes when the short is dropped to the region of the knee, and the knee-to-knee strain is carried along a line—which then becomes practically a straight line—from the left hip through and across the crotch of the fly opening to the right hip point. This strain is not parallel with the facing. Neither is it at right angles to the facing. It comes at a substantial angle to the facing and intersects the facing at the fold or crotch of the fly, whereby the facing at the crotch has to carry the strain obliquely from one front leg piece to the other front leg piece.

The strain must be transferred obliquely from one side piece on to the facing, carried by the facing obliquely across the crotch point of the fly, and re-transferred on to the body of the goods,—all without localizing the strain on any stitching sufficiently to result in tearing of the goods or stitching. Our fly facing construction is peculiarly adapted to take this strain.

Another feature of our invention in connection with our continuous facing construction for the fly opening is the dropping of the crotch of the fly opening down as far as possible toward the crotch of the garment itself, whereby the angle between the line of the facing and the line of the strain in question will be greater, thereby further minimizing the tendency to tear the goods or stitching in transferring the strain from the body piece to the facing and again on to the other body piece.

These and further objects, features and advantages are set forth in the following description of a preferred embodiment of our invention, as illustrated in the accompanying drawings, wherein Fig. 1 is a front view of the garment as it would appear laid flat upon a table with the crotch of the garment exposed;

Fig. 4 is a somewhat diagrammatic vertical section taken on the line 4—4 along the fly;

Figure 1:
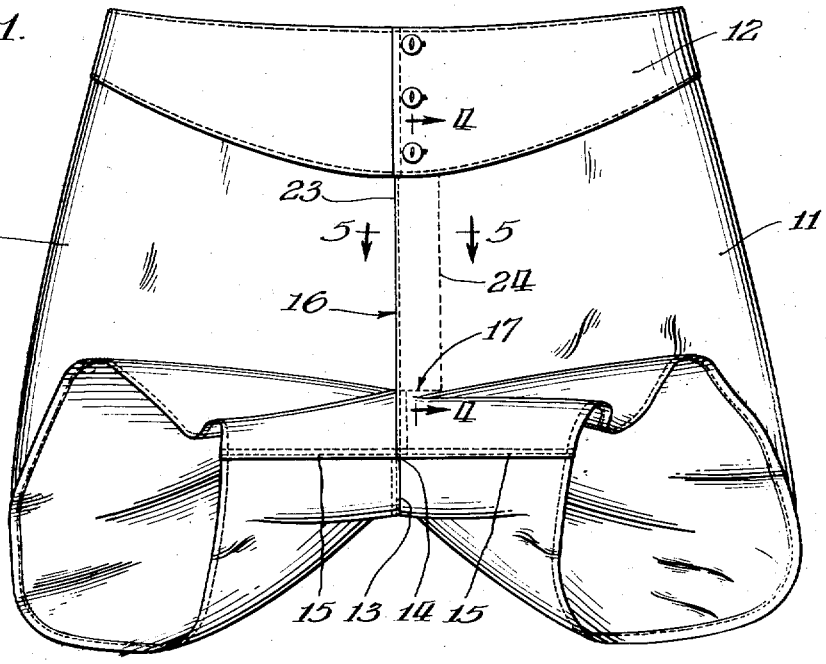

The shorts here shown are formed of two major pieces 10 and 11 forming both the front and back sides of the left and right legs respectively and reinforced at their tops by a crescent shaped waist band 12. The pieces 10 and 11 are joined by a seam 13 from the waist down to the crotch 14 of the garment. Below the crotch 14 the two edges of the forward and rear edges of the left piece 10 are stitched together by an inseam 15 to form the leg. The same is true of the left piece 11. On the front side, and above the crotch 14 of the garment, the sides 10 and 11 are left open to form a fly opening 16, except for a short distance between the crotch 17 of the fly opening and the crotch 14 of the garment where the pieces 10 and 11 are seamed together by stitching 18.

Figure 2:
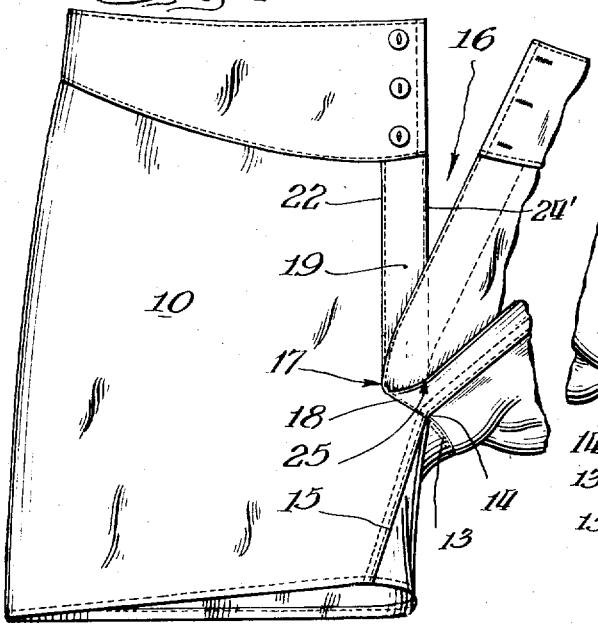
Fig. 2 is a fragmentary front view of the right half of the garment showing particularly the body piece forming the front of the right leg, as it appears when laid flat and smooth.
Figure 3:
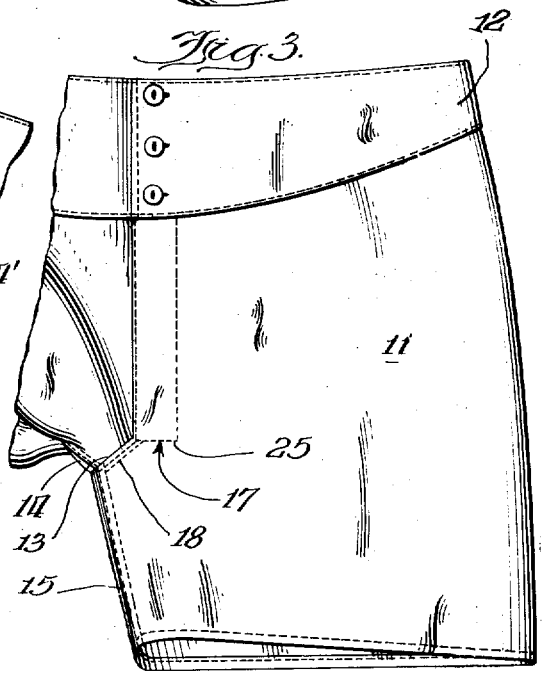
Fig. 3 is a corresponding view to show the left leg body.

The short length of stitching 18 appears in Fig. 1, as aligned with the fly opening 16, and in fact is, when the garment is worn. However, it will be noted from Figs. 2 and 3 that as the goods is cut, the edge of each piece 10, 11, which is sewn by the stitching 18 is at a considerable angle to the line of fly, when the piece is laid flat. The stitching 18 forms something of a bottom limit beyond which the crotch 17 of the fly could not be dropped without having to complicate the fly opening and its facing by angularly offsetting it.

Figure 5:
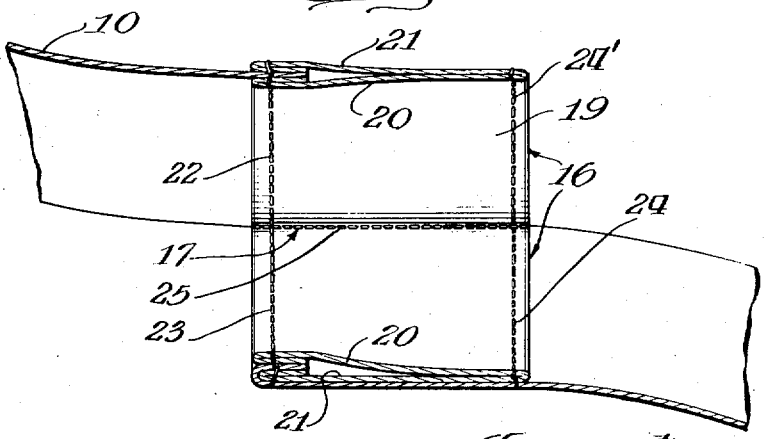
Fig. 5 is a somewhat diagrammatic plan section taken along the line 5—5 of Figs. 1 and 4.

The fly or facing 19 for the fly opening 16 is formed from a strip of fabric material folded longitudinally with the opposed raw edges of its inner and outer plies 20 and 21 turned inwardly as shown in Fig. 5. One-half of the facing 19 is secured to the front edge of the right body piece 10 by a line of stitching 22, the raw edge of the piece 10 being secured between the inturned edges of the plies 21 and 20.

The other half of the facing 19 is secured to the edge of the left body piece 11. The piece 11 extends on the outside of the two plies 20 and 21 of the facing and is turned backwardly and engaged between the inturned edges of the plies 20 and 21, being stitched down by a line of stitching 23 forming a continuation of the stitching 22. The opposite or folded edge of the facing 19 is stitched down to the piece 11 by a line of stitching 24. This stitching, as will later be explained, is of particular importance in our construction. If preferred, the stitching 24 may extend as indicated at 24 along the folded edge of the first half of the facing 19. The extension 24' of this stitching, however, would extend only through the plies 20 and 21 of the facing and would not extend through either of the body pieces.

At the crotch or fold of the fly opening 16 the facing is sewn to the left body piece 11 by a transverse line of stitching 25. Both ends of the facing 19 extend upwardly to the upper edges of the body pieces 10 and 11 respectively where they are anchored to the rear waist bands 26.

Figure 6:
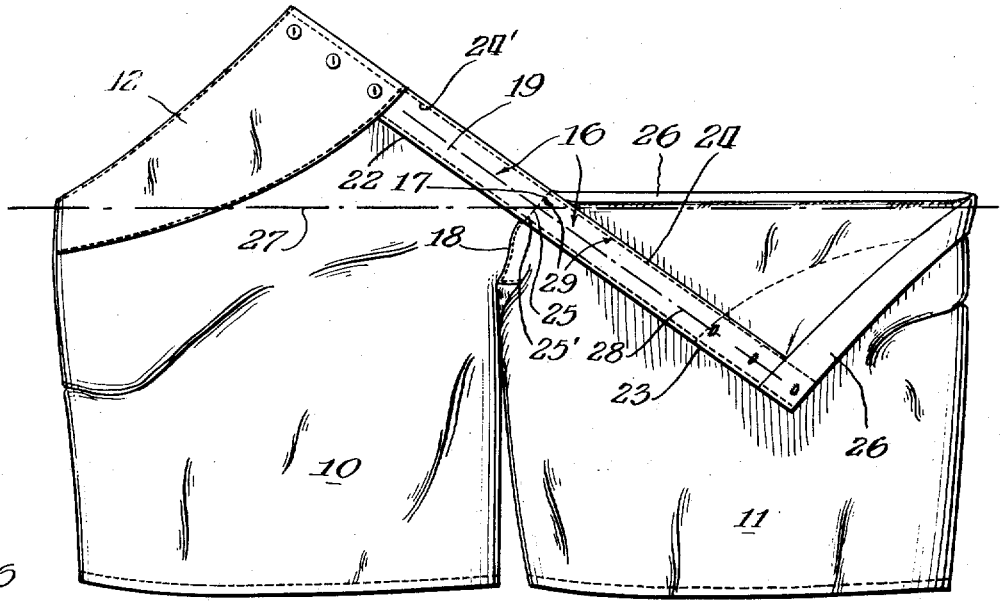
Fig. 6 is a front view of the shorts with the fly fully extended and showing the cross-the-fly-facing strain which our construction is designed to resist.
Figure 7:
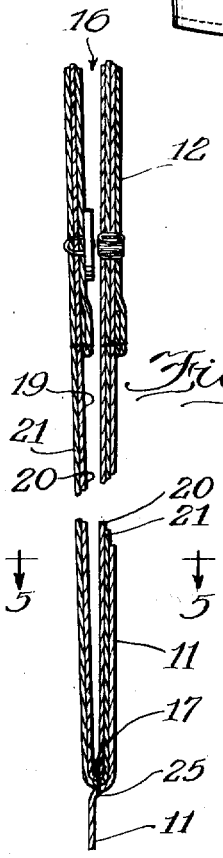

As previously explained, we have found that the tearing of underwear at the crotch of the fly opening is not the result of the strains to which its tearing is usually attributed, such as an end-to-end strain longitudinally of the fly facing, an extreme swinging of the leg such as in kicking a football, or a transverse thigh-to-thigh strain. To the contrary, we have found that the strains which result in a tearing at the crotch of the fly opening are occasioned by a knee-to-knee strain when the garment has been dropped to the region of the knee. When in this position, as indicated in Fig. 6, the strain may be considered as extending between the left and right hip points, that is, from the left center of the waist band to the right center of the waist band. If the fly opening were buttoned up as in Fig. 1, the line of strain between the two hip points would of course follow along the front waist bands. But when the fly opening is not buttoned, as in the circumstances of Fig. 6, it assumes a line of strain as a straight line 27 passing through the crotch of the fly opening. The two triangular portions represented by the upper ends of the button and button-hole flies respectively then become mere inert flaps. In Fig. 6, for the sake of clarity, these flaps are shown smoothed out into a vertical plane.

This knee-to-knee strain is developed when the garment is in the position described and the wearer lets the knees spread apart, often unconsciously developing a very great strain along the line 27. It will be seen from Fig. 6 that the line 27 intersects the center line 28 of the fly facing 28 at an angle of about 45 degrees. The entire knee-to-knee strain which can be considered as concentrated along the line 27 has to be transferred from the piece 10 to the piece 11, or vice versa, through the facing 19 at the crotch 17 of the fly opening. That this is true can be seen from the fact that except for the short stitching 18, which comes below the line of strain 27, the piece 10 is not directly sewn or secured to the piece 11, but is connected only through the intermediary of the facing 19.

A mere continuous facing along the fly opening would not successfully effect the transfer of strain along this opening without danger of tearing because the strain is not parallel with the facing 19. Instead it is at a considerable angle to it. It is important to the most successful withstanding of this knee-to-knee strain that in addition to the continuity of the facing 19 past the crotch 17 of the fly opening, the strain concentrated along the line 27 be transferred from the piece 10 to the facing on one side of the crotch 17 and then, on the other side of the crotch, be retransferred from the facing to the piece 11, in such a manner as to minimize the danger of concentrating the strain to a degree where it will tear the stitching.

One helpful factor in carrying out this function is the line of stitching 24 which secures one edge of the folded facing 19 to the body piece 11. Were it not for this line of stitching practically the entire strain would be concentrated at the point 25' at one end of the transverse stitching 25 across the crotch of the fly opening, although some of the strain would be distributed across the remainder of the length of the transverse stitching 25. By having the stitching 24 include the piece 11, we distribute the strain over the full length of the transverse stitching 25, and also over a considerable length of the stitching 24 from the crotch 17 of the fly opening upwardly or outwardly in a direction toward the waist band of the body piece 11,—a region substantially as embraced by the bracket 29.

This distribution over the region 29 of the stitching 24 is further aided by the fact that the line 27 of strain is at substantially 45 degrees to the center line 28 of the facing. The center line of the fly is along the maximum bias of the goods. This supplies the stretch or resiliency which further distributes the strain along the region 29 and especially avoids a dangerous concentration of the strain at the precise point where the line 27 intersects the stitching 24.

On the other side of the crotch of the fly opening the strain is transferred from the body piece 10 to the fly facing 19 over a distributed region of the stitching 22. This minimizes the regions of concentrated strain which might result in tear. Also, the upper end of the short line of stitching 18 from the crotch of the fly opening to the crotch 14 of the garment itself is relieved. The resiliency afforded by the strain coming along the bias of the goods is a further aid.

Having thus described our invention, what we claim as new and desire to secure by Letters Patent of the United States is:

1. In a pair of pants, the combination of right hand and left hand pieces of material shaped to form a trunk and legs, each of said pieces having a portion of its opposite edges secured together to form the legs, and the adjacent edges of said pieces being secured together along a line extending from the crotch up the back of the pants to form the trunk, with means for detachably securing the adjacent front edges of the right hand and left hand pieces together, a facing strip for said adjacent front edges comprising a continuous piece of material extending down one of said adjacent front edges and secured thereto and folded up at the bottom of the fly and extending up the other of said adjacent front edges and secured thereto, whereby ripping of the seam at the base of the fly is prevented, said facing strip comprising a piece folded back on itself to form a double layer, and said strip having a transverse line of stitching at the base of the fly and the strip overlying the inner side of the fly and having both edges stitched to that portion of the pants forming the inner side of the fly to resist ripping by diagonal strains.

2. A pair of pants comprising a back portion, a left front portion, a right front portion, a right leg portion and a left leg portion, the portions forming a crotch, a fly opening between the right and left side portions extending downwardly from the waist to a point above the crotch, a seam joining said front portions from said point down to the crotch, said edge of one front portion constituting the inner flap of the fly opening and the said edge of the other front portion constituting the outer flap of the fly opening, and a facing for the fly opening comprising a continuous strip of fabric folded longitudinally back upon itself to form a double ply with a folded edge, the double ply facing being folded transversely, one arm of the facing being stitched along its edge opposite the said folded edge to the edge of the inner flap and the other arm being stitched along both its folded and its opposite edges to the outer flap to overlap the outer flap adjacent its edge, the facing also being stitched along said transverse fold to the outer flap.

3. The combination with a pair of pants comprising a back portion, a left front portion, a right front portion, a right leg portion and a left leg portion, and including a crotch, of a fly opening between the right and left side portions extending downwardly from the waist, said edge of one front portion constituting the inner flap of the fly opening and the said edge of the other front portion constituting the outer flap of the fly opening, and a facing for the fly opening comprising a continuous strip of fabric folded transversely, one arm of the facing being stitched to the edge of the inner flap along the edge of the facing adjacent the field of the inner front flap and the other arm of the facing being stitched to the outer flap along the opposite edge of the facing, and the facing being stitched along its transverse fold to the outer flap.

JOSEPH K. HEYMAN.
ALFRED F. WENZEL.